United States Patent
Leising et al.

(10) Patent No.: US 9,458,967 B2
(45) Date of Patent: Oct. 4, 2016

(54) INTEGRATED LUBRICATION COOLING SYSTEM

(71) Applicant: Ingersoll-Rand Company, Davidson, NC (US)

(72) Inventors: Paul A. Leising, Tonawanda, NY (US); Thomas Gerber, Williamsville, NY (US)

(73) Assignee: Ingersoll-Rand Company, Davidson, NC (US)

( * ) Notice: Subject to any disclaimer, the term of this patent is extended or adjusted under 35 U.S.C. 154(b) by 165 days.

(21) Appl. No.: 14/145,638

(22) Filed: Dec. 31, 2013

(65) Prior Publication Data

US 2015/0184802 A1 Jul. 2, 2015

(51) Int. Cl.
| | |
|---|---|
| *F16N 39/02* | (2006.01) |
| *F16N 39/06* | (2006.01) |
| *F01M 5/00* | (2006.01) |
| *F04D 29/06* | (2006.01) |
| *F04D 29/58* | (2006.01) |

(52) U.S. Cl.
CPC .............. *F16N 39/02* (2013.01); *F01M 5/002* (2013.01); *F04D 29/06* (2013.01); *F04D 29/58* (2013.01); *F16N 39/06* (2013.01)

(58) Field of Classification Search
CPC ....... F01M 5/002; F16N 39/02; F16N 39/06; F04D 29/06; F04D 29/58
USPC ................. 184/6.22, 6.16, 6.28, 6; 417/243; 137/625.46, 887
See application file for complete search history.

(56) References Cited

U.S. PATENT DOCUMENTS

| | | | | |
|---|---|---|---|---|
| 2,217,329 | A * | 10/1940 | Bentley | F16N 7/40 184/6.28 |
| 2,679,320 | A * | 5/1954 | Walton | B01D 25/00 210/102 |
| 3,223,197 | A * | 12/1965 | Conover | F01M 1/02 184/104.3 |
| 4,287,908 | A * | 9/1981 | Storgard | F02M 37/0023 137/255 |
| 4,324,213 | A * | 4/1982 | Kasting | B01D 35/12 123/196 A |

(Continued)

FOREIGN PATENT DOCUMENTS

DE 60127643 T2 7/2007

OTHER PUBLICATIONS

International Search Report, PCT/US2014/066902, 4 pages, Feb. 13, 2015.

(Continued)

*Primary Examiner* — Michael Riegelman
(74) *Attorney, Agent, or Firm* — Taft, Stettinius & Hollister LLP

(57) ABSTRACT

A system including a lubrication system, including a block with a first cooler interface, a second cooler interface, and at least one lubrication passage extending through the block, wherein the at least one lubrication passage fluidly couples to the first cooler interface and to the second cooler interface, a first cooler including a first mating cooler interface coupled to the first cooler interface, and a second cooler including a mating second cooler interface coupled to the second cooler interface, and a first valve within the block, wherein the first valve is configured to control a flow of a lubricant through the at least one lubrication passage relative to the first cooler and/or the second cooler.

17 Claims, 5 Drawing Sheets

(56) References Cited

U.S. PATENT DOCUMENTS

| | | | | |
|---|---|---|---|---|
| 4,370,957 A * | 2/1983 | Skatsche | ............. | F02B 77/14 123/196 AB |
| 4,424,778 A * | 1/1984 | Yoshida | ............. | F01P 11/08 123/196 AB |
| 5,855,226 A * | 1/1999 | Palmer | ............. | F15B 9/10 137/596.14 |
| 6,010,320 A * | 1/2000 | Kwon | ............. | F04C 23/00 184/6.16 |
| 6,182,616 B1 | 2/2001 | Itoh et al. | | |
| 6,221,130 B1 * | 4/2001 | Kolodziej | ............. | B01D 53/261 95/120 |
| 6,290,208 B1 * | 9/2001 | Arnett | ............. | B01D 35/12 137/625.11 |
| 6,485,636 B1 * | 11/2002 | Moss | ............. | B01D 35/12 210/117 |
| 6,941,922 B2 * | 9/2005 | Williams | ............. | F01M 1/02 123/196 R |
| 7,854,299 B2 * | 12/2010 | Czechowski | ............. | F16N 39/02 184/6 |
| 9,016,245 B2 * | 4/2015 | Van Farowe | ............. | F01P 11/08 123/41.33 |
| 2003/0143085 A1 * | 7/2003 | Fletcher | ............. | F04B 53/06 417/307 |
| 2003/0234008 A1 * | 12/2003 | Van Winkle | ............. | F01P 9/00 123/559.1 |
| 2008/0006229 A1 * | 1/2008 | Wilmink | ............. | B01D 35/153 123/41.33 |
| 2009/0014244 A1 * | 1/2009 | Cavarello | ............. | B01D 35/12 184/6 |
| 2011/0303490 A1 | 12/2011 | Czechowski et al. | | |
| 2015/0184802 A1 * | 7/2015 | Leising | ............. | F01M 5/002 184/6.22 |

OTHER PUBLICATIONS

Written Opinion, PCT/US2014/066902, 7 pages, Feb. 13, 2015.

* cited by examiner

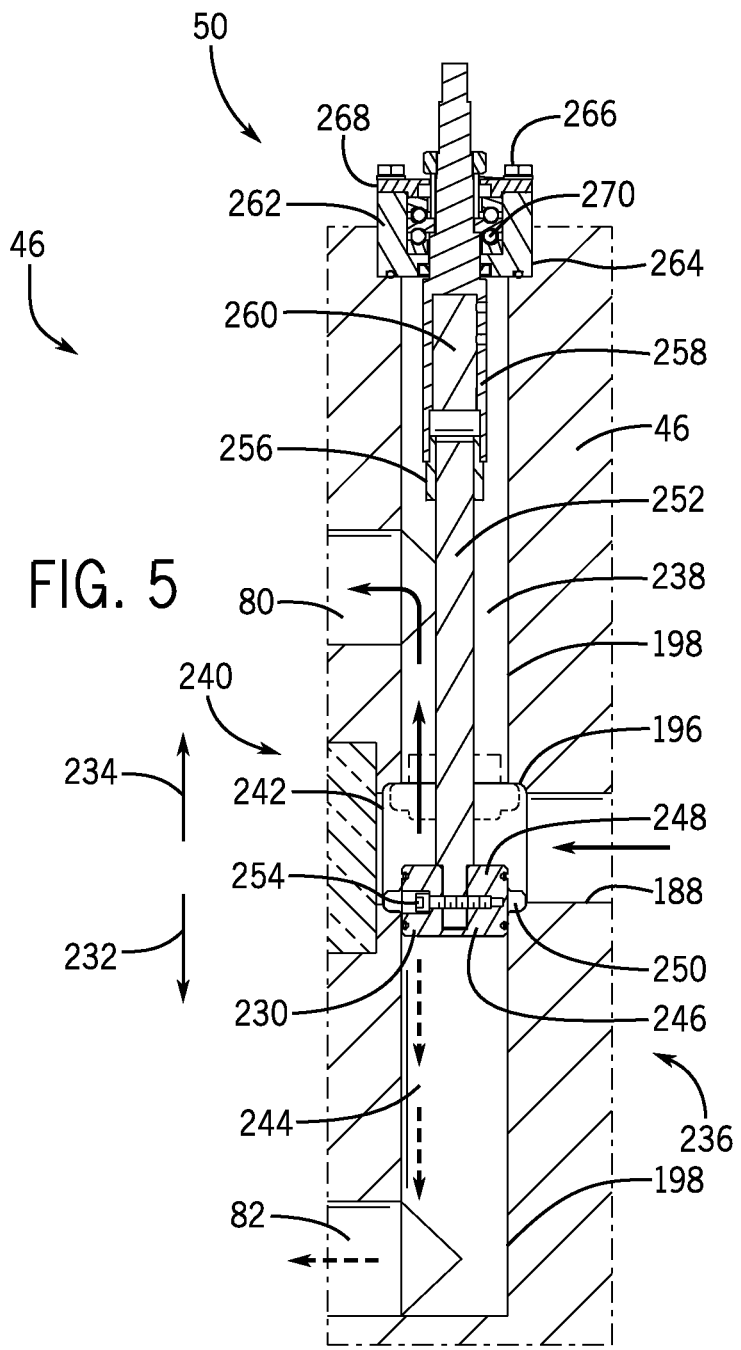

INTEGRATED LUBRICATION COOLING SYSTEM

BACKGROUND

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Compressors are used in a variety of applications to compress and transmit gas flows, such as air, natural gas, inert gases, and so forth. Compressors generally include a lubrication system to route a lubricant to interface regions between rotating and stationary parts. However, the lubrication system generally couples to the compressor with multiple external connections, tubing, and components that are separate from one another. These connections may make maintenance of the lubrication system difficult as well as increase the possibility for leaks.

BRIEF DESCRIPTION OF THE DRAWINGS

Various features, aspects, and advantages of the present invention will become better understood when the following detailed description is read with reference to the accompanying figures in which like characters represent like parts throughout the figures, wherein:

FIG. 5 is a partial cross-sectional view of an embodiment of a valve of the system of FIGS. 1-4.

DETAILED DESCRIPTION OF SPECIFIC EMBODIMENTS

One or more specific embodiments of the present invention will be described below. These described embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The disclosed embodiments include a lubrication system with a block (i.e., a one-piece structure or manifold) that has integral lubricant and coolant passages that reduce the number of fluid connections to a compressor system. In other words, the lubricant and coolant passages (e.g., 2, 3, 4, 5, 6, 7, 8, 9, 10, or more) extend through the block along various paths without any connection points (e.g., no internal leak prone regions) thereby enabling multiple fluid parts to be connected simultaneously by connecting to inlets and outlets of the block. For example, the block may have a single lubricant inlet and outlet as well as a single coolant inlet and outlet. The lubrication system may also reduce the number of fluid connections by including integral lubrication filter passages within the block that eliminate external coupling of lubrication filters. With fewer fluid connections, the lubrication system decreases the time needed for assembly and coupling to a compressor system as well as reduces the number of locations that can leak.

In operation, the lubrication system controls lubricant (e.g., oil) and coolant (e.g., water, refrigerant) flow with valves inside passages of the block. For example, the lubrication system may include a first valve that controls coolant flow between first and second coolers, and a second valve that controls lubricant flow between the first and second coolers. Finally, the lubrication system may include a third valve that controls lubricant flow between lubrication filters. These valves allow selective use of the coolers and filters enabling maintenance during operation of the compressor system. Again, the valves are mounted to (e.g., within) the block, rather than being coupled to various external conduits. Thus, the block with a multitude of fluid paths, valves, filters, and other flow control components may be mounted and unmounted as a single unit.

Figure 1:
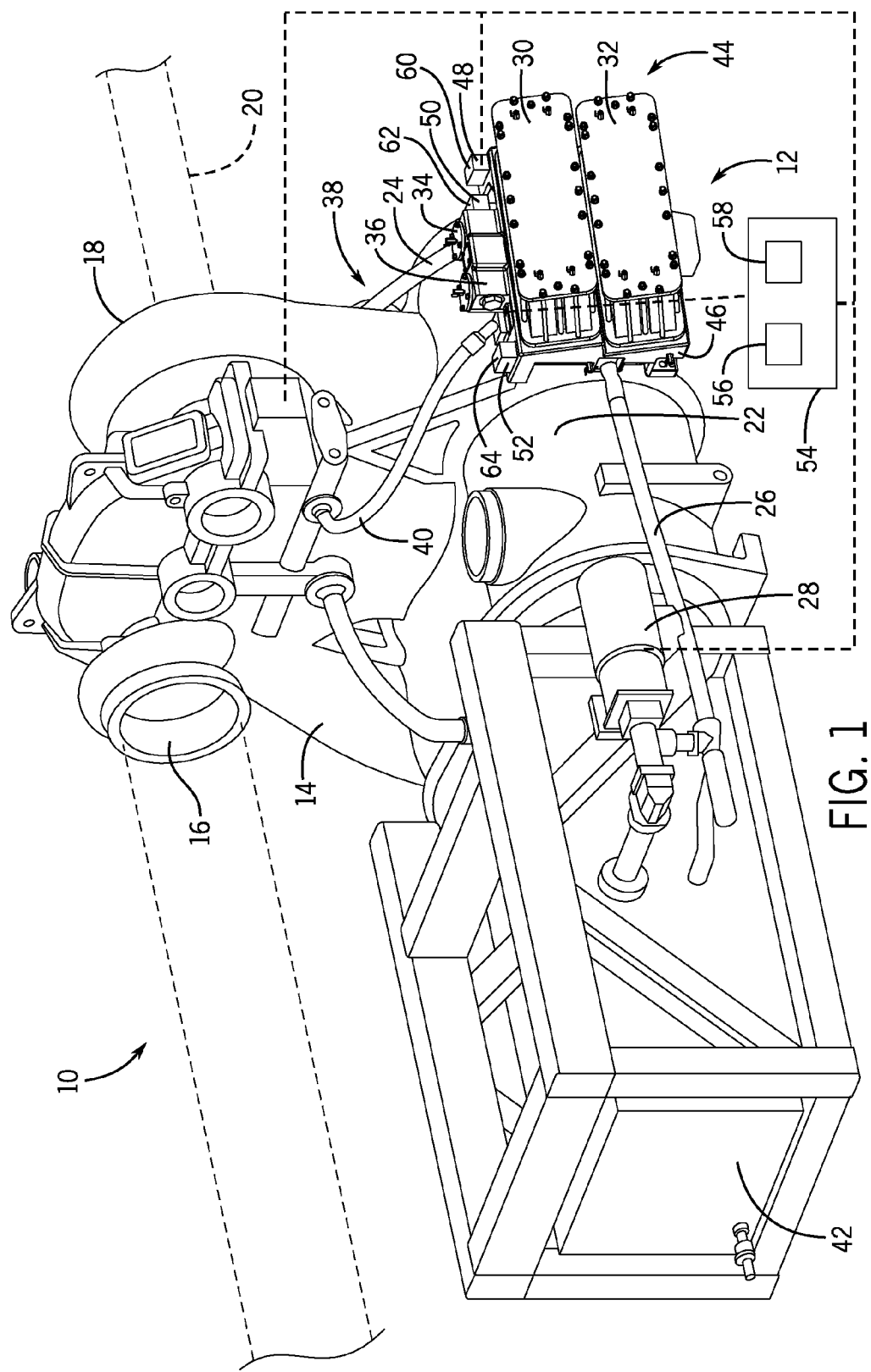
FIG. 1 is perspective view of an embodiment of a compressor system with an integrated lubrication cooling system.

FIG. 1 is perspective view of a compressor system 10 with an integrated lubrication cooling system 12. The compressor system 10 may be a natural gas compressor system 10 that compresses natural gas for transport through pipelines. The compressor system 10 includes a compressor 14 with an inlet 16 and an outlet 18. As natural gas enters the compressor 14 through the inlet 16, the compressor 14 compresses the natural gas before discharging the natural gas through the outlet 18 and into the pipeline 20. In order to lubricate moving components within the compressor 14, the compressor system 10 includes lubricant in an lubricant supply 22. In operation, the lubricant lubricates the moving components within the compressor 14 enabling the compressor system 12 to operate for long periods. However, as the compressor 14 operates, the lubricant temperature in the lubricant supply may increase, as the lubricant absorbs heat generated by friction between moving components, heat generated due to compression, and other reasons. Increases in lubricant temperature reduce the viscosity of the lubricant in the main lubricant supply, which reduces the ability of the lubricant to lubricate and protect the moving components within the compressor 14. Accordingly, the compressor system 10 includes the integrated lubrication cooling system 12, which both cools and filters the lubricant for use in the compressor system 10.

The integrated lubrication cooling system 12 receives lubricant from the compressor system 14, through a main lubricant supply conduit 24 and/or a secondary lubricant supply conduit 26. In operation, an lubricant pump 28 pumps lubricant through the compressor 14, the main lubricant supply conduit 24, and into the integrated lubrication cooling system 12. In the integrated lubrication system 12, the lubricant is cooled in first and second coolers 30 and 32 and then filtered by the filters 34 and 36. The first and second coolers 30 and 32 operate as heat exchangers by simultaneously moving coolant and lubricant through neighboring conduits. In other words, as the hot lubricant flows through the first and second coolers 30, 32 the hot lubricant loses thermal energy to coolant flowing through the first and second coolers 30, 32. The integrated lubrication cooling system 12 receives a continuous supply of coolant from a coolant system 38 (i.e., coolant source and pump). In operation, the coolant supply 38 continuously pumps coolant (e.g., water, refrigerant, etc.) through the integrated lubrication cooling system 12 enabling the first and/or second coolers 30, 32 to transfer thermal energy from the lubricant to the coolant. After cooling the lubricant in the first and/or second coolers 30, 32, the lubricant passes through the first and second lubricant filters 34, 36. The first and second lubricant filters 34, 36 remove sediment, metal particles, and other debris from the lubricant before returning the lubricant to the main lubricant supply 22 in the lubricant return conduit 40. In some embodiments, the compressor system 10 may include an auxiliary lubricant supply 42 that stores excess lubricant for use in the compressor 14. Accordingly, lubricant may be supplied to the compressor 14 from the auxiliary lubricant supply 38 through the secondary lubricant supply conduit 26 coupled to the integrated lubrication cooling system 12.

The integrated lubrication cooling system 12 enables selective use of the first and/or second coolers 30, 32 and the first and/or second lubrication filters 34, 36. Specifically, the integrated lubrication cooling system 12 may include one or more valves 44 that control fluid flow through passages (e.g., conduits) within the integrated lubrication cooling system 12. As will be explained in more detail below these passages may be integrally formed (e.g., cast, machined) into the block 46 (e.g., one-piece structure, module, or manifold). For example, the integrated lubrication cooling system 12 may include a first coolant valve 48, a filter valve 50, and a lubrication valve 52. As will be explained in detail below, these valves 44 enable selective use of the first cooler 30 and/or the second cooler 32. For example, in certain conditions the valves 44 may enable flow through both coolers 30 and 32 to improve cooling, while in other conditions the values 44 may enable flow through only one cooler. Accordingly, while one of the coolers and filters is operating an operator may perform maintenance on the other, thus providing a redundant system that enables maintenance while continuously operating the compressor system 10.

In some embodiments, the compressor system 10 may include a controller 54 with a processor 56 and a memory 58 that stores instructions executable by the processor 56 for controlling the valves 44 (e.g., electronic actuator controller valves 44). The controller 54 communicates with actuators 60, 62, and 64 (e.g., electronic actuators) coupled to the valves 44, enabling the controller 54 to control movement of the valves 44. For example, the controller 54 may sense that a filter or cooler is no longer functioning properly (e.g., unhealthy state) and thus signal the actuator 60 to move the first coolant valve 48 and the actuator 64 to move the lubrication valve 52. As the valves 48 and 52 move, the coolant and lubricant flow switches between the coolers 30, 32, thereby deactivating the problematic cooler and activating the healthy cooler (if not already active) to enable maintenance while the system 10 remains online. Similarly, the controller 54 may sense that one of the filters 34 or 36 is no longer functioning properly (e.g., unhealthy state), and therefore signals the actuator 62 to change lubricant flow between the filters 34, 36, thereby deactivating the problematic filter and activating the healthy filter (if not already active) to enable maintenance while the system 10 remains online.

Figure 2:
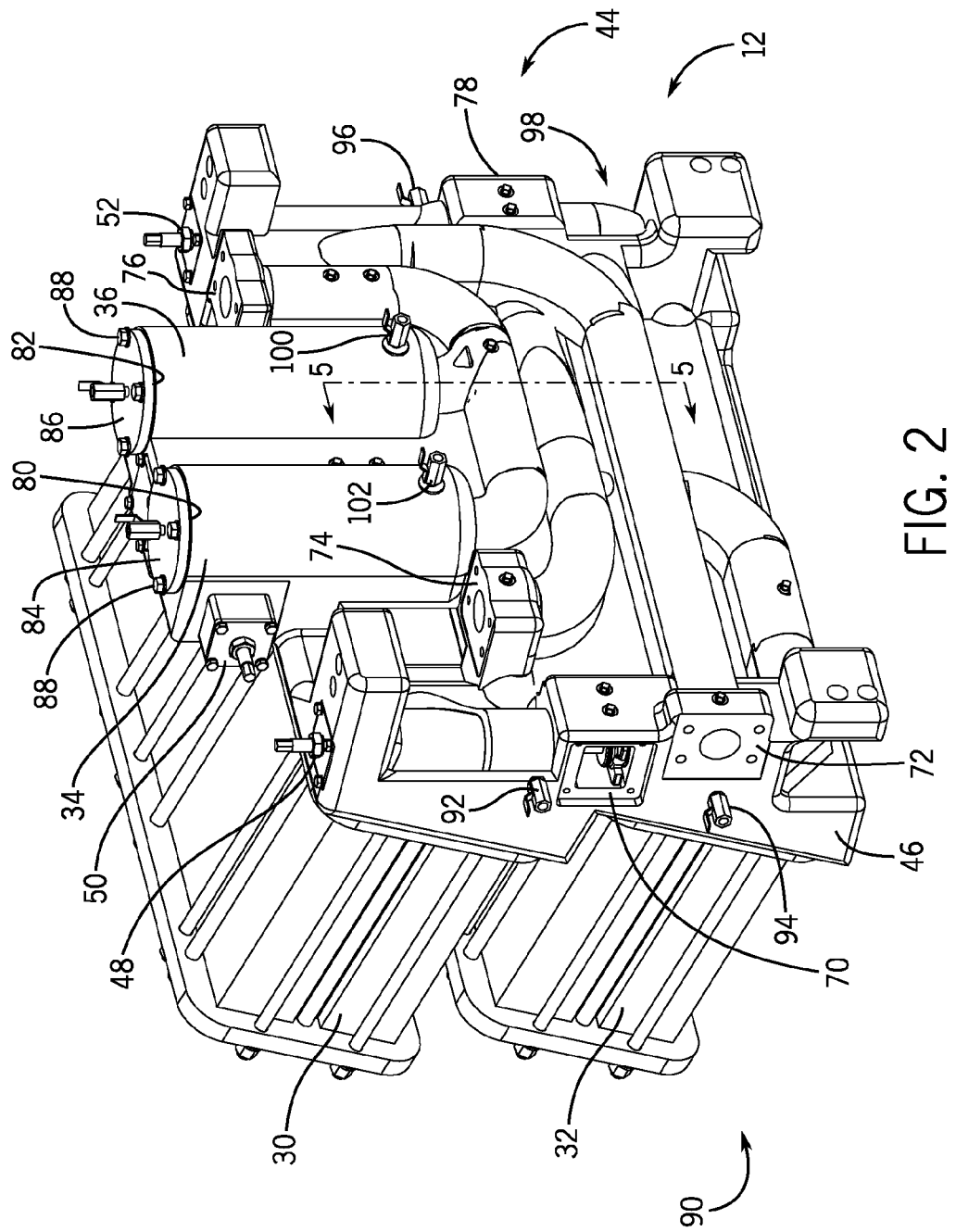
FIG. 2 is a rear perspective view of an embodiment of the integrated lubrication cooling system of FIG. 1.

FIG. 2 is a rear perspective view of the integrated lubrication system 12. As illustrated, the block 46 may reduce the number of separate external fluid conduits, fluid inlets, and fluid outlets, and therefore the number of external fluid connections. Fewer fluid connections (and fewer separate parts) simplifies assembly and reduces maintenance requirements of the integrated lubrication system 12, saving time and enabling the compressor system 10 to operate for longer periods between shutdowns. For example, the block 46 may include one coolant inlet 70 and one coolant outlet 72 for supplying coolant to the first and second coolers 30, 32 through various internal fluid paths integrated into the block 46. Similarly, the block 46 includes a first lubricant inlet 74 and a lubricant outlet 76 for supplying lubricant to the first and second coolers 30 and 32. In some embodiments, the block 46 may include a second lubricant inlet 78 that enables additional lubricant flow into the block 46. For example, the second lubricant inlet 78 may enable lubricant from the auxiliary lubricant supply 42 to flow through block 46; first and second coolers 30, 32; and first and second filters 34, 36 for use in the compressor 14 (e.g., when lubricant levels in the compressor 14 are low).

In addition, the block 46 includes first and second filter receptacles 80 and 82 integrated into block 46. The first and second filter receptacles 80 and 82 receive the first and second filters 30 and 32 eliminating additional external fluid connections to the block 46. The first and second receptacles 80, 82 are covered with respective first and second covers 84 and 86 that couple to the block 46 with fasteners, such as bolts 88 or other threaded fasteners. The first and second covers 84 and 86 retain and seal the first and second filters 34, 36 within the block 46. Accordingly, the integral first and second filter receptacles 80, 82 eliminate external fluid coupling of filters to the block 46.

As explained above, the integrated lubrication system 12 provides first and second coolers 30, 32 and first and second filters 34, 36. In operation, the integrated lubrication system 12 may switch between using the first and second coolers 30, 32 to cool the lubricant and/or the first and second filters 34, 36 to filter the lubricant. In other words, the integrated lubrication system 12 enables selective use of the first cooler 30, the second cooler 32, or simultaneous use of the first and second coolers 30, 32. Similarly, the integrated lubrication system 12 enables selective use of the first filter 34, the second filter 36, or the simultaneous use of the first and second filters 34, 36. By including two coolers 30, 32 and two filters 34, 36, the integrated lubrication system 12 enables continued operation of the compressor system 10 during maintenance of one of the coolers 30, 32 and one of the filters 34, 36. Moreover, to facilitate maintenance (i.e., removal of one of the coolers 30, 32 or one of the filters 34, 36) the integrated lubrication system 12 includes multiple valves 90 (e.g., ball valves) for draining fluid. For example, the integrated lubrication system 12 may include a first ball valve 92 for draining coolant out of the first cooler 30, and a second ball valve 94 that drains coolant out of the second cooler 32 during maintenance. Similarly, a third ball valve 96 may be used for draining lubricant out of the first cooler 30, and a fourth ball valve 98 may be used for draining lubricant out of the second cooler 32 during maintenance. Finally, the block 46 may include a fifth ball valve 100 and a sixth ball valve 102 that enables lubricant removal from the first and second filter apertures 80 and 82.

Figure 3:
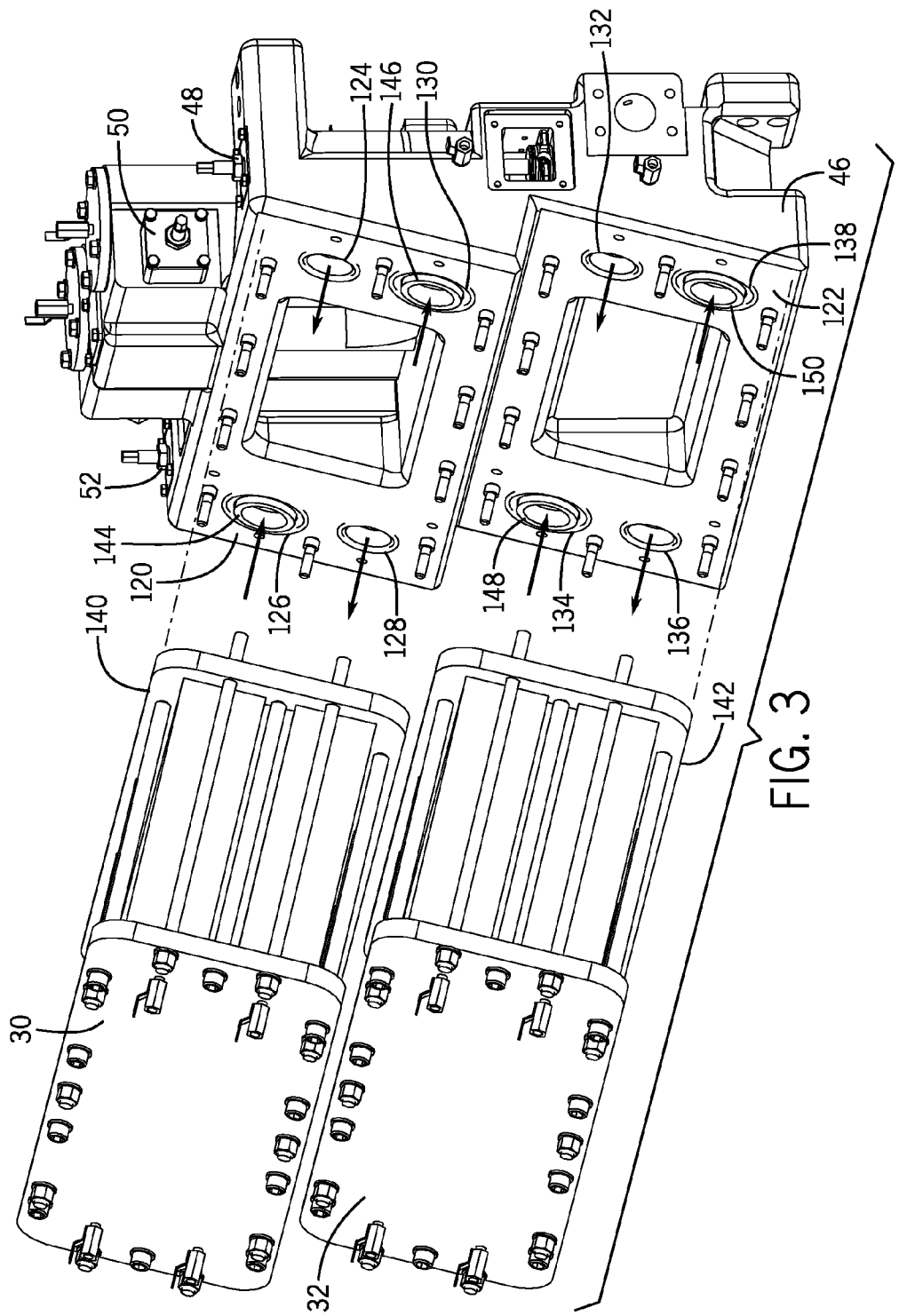
FIG. 3 is a partially exploded front perspective view of an embodiment of the integrated lubrication cooling system of FIGS. 1 and 2.

FIG. 3 is a partially exploded front perspective view of the integrated lubrication system 12. As illustrated, the first and second coolers 30, 32 are separated from the block 46 exposing a first block face 120 and a second block face 122.

The first and second block faces 120, 122 includes multiple inlets and outlets that enable coolant and lubricant to flow between block 46 and the coolers 30, 32. Specifically, the first block face 120 includes a first coolant exit 124 that feeds coolant into the first cooler 30 and a first coolant inlet 126 that enables coolant exiting the cooler 30 to reenter the block 46. Similarly the first block face 120 includes a first lubricant exit 128 enabling lubricant to exit the block 46 and enter the first cooler 30, while a first lubricant inlet 130 enables fluid to exit the first cooler 30 and reenter the block 46. The second block face 122 likewise includes a second coolant exit 132, a second coolant inlet 134, a second lubricant exit 136, and a second lubricant inlet 138 to enable coolant and lubricant flow between the block 46 and the second cooler 32. These inlets and outlets correspond to inlets and outlets on a first cooler interface 140 and a second cooler interface 142. In operation, the first block face 120, the second block face 122, the first cooler interface 140, and the second cooler interface 142 enable fluid communication between the block 46 and the first and second coolers 30, 32. In some embodiments, the first coolant inlet 126, first lubricant inlet 130, second coolant inlet 134, and second lubricant inlet 138 include respective check valves 144, 146, 148, and 150 (e.g., one-way valves). The check valves 144, 146, 148, and 150 enable fluid (i.e., coolant or lubricant) to reenter the block 46 through the respective inlets 126, 130, 134, and 138; however, the check valves 144, 146, 148, and 150 block fluid flow from exiting the block 46 through the respective inlets 126, 130, 134, and 138.

Figure 4:
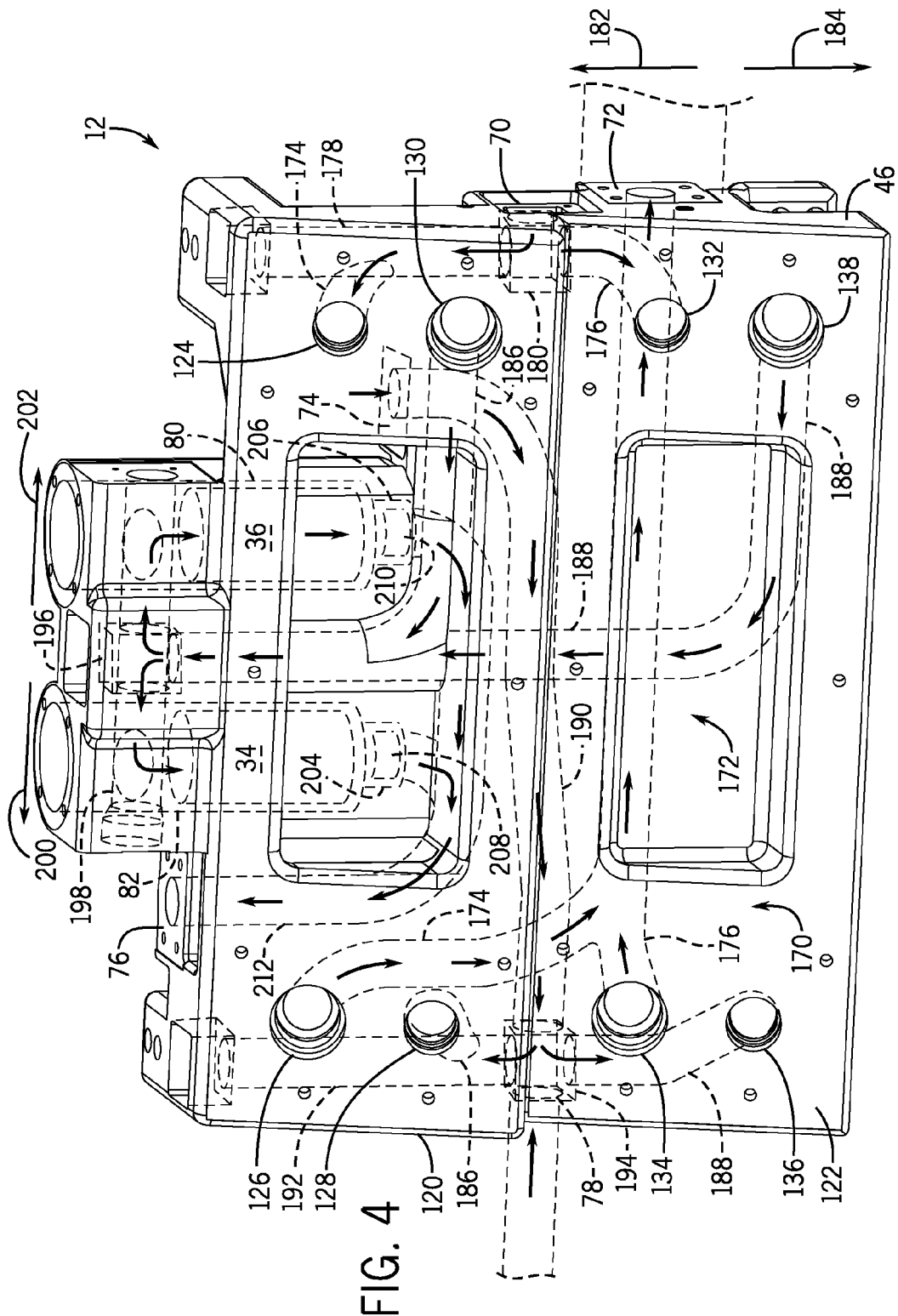
FIG. 4 is a rear perspective view of an embodiment of a lubrication manifold of the system of FIGS. 1-3.

FIG. 4 is a rear perspective view of the block 46 (e.g., one-piece manifold). As illustrated, the block 46 includes an integral coolant passage 170 and lubricant passage 172 that enable coolant and lubricant to flow into and through the integrated lubrication system 12. More specifically, the coolant passage 170 includes a first coolant passage 174 and a second coolant passage 176. As illustrated, the first coolant passage 174 fluidly couples to the first coolant inlet 124, the first coolant exit 126, and the second coolant passage 176, which enables coolant to circulate through the first cooler 30. The second coolant passage 176 fluidly couples to the second coolant inlet 132, the second coolant outlet 134, the first coolant passage 174, and to the coolant exit 72, which enables coolant to circulate through the second cooler 32 before exiting the block 46. In order to receive coolant, the first coolant passage 174 fluidly couples to a coolant valve aperture 178 and the second coolant passage 176 fluidly couples to a coolant valve chamber 180. As will be explained in detail below in FIG. 5, the valve 48 (seen in FIG. 2) controls the coolant flow entering the block 46 through the coolant inlet 70. In operation, as coolant flows into the block 46, the valve 48 directs coolant flow into the first coolant passage 174 or into the second coolant passage 176. More specifically, the valve 48 may direct the coolant entering the coolant valve chamber 180 to flow through the coolant valve aperture 178 and into the first coolant passage 174 or out of the coolant valve chamber 180 and into the second coolant passage 176.

For example, the valve 48 may block coolant flow into the second coolant passage 176 and therefore direct coolant to flow in direction 182 through the coolant valve aperture 178 and into the first coolant passage 174. As the coolant flows through the first coolant passage 174, the coolant exits the block 46 through the first coolant exit 124 and enters the first cooler 30. In the cooler 30, the coolant exchanges thermal energy (e.g., transfers heat) with a lubricant and then renters the block 46 through the first coolant inlet 126. The coolant then flows again through the first coolant passage 174 before entering the second coolant passage 176. The coolant then passes through the second coolant passage 176 and exits the block 46 through coolant outlet 72. Alternatively, the valve 48 may plug the coolant valve aperture 178 to direct coolant flow out of the coolant valve chamber 180 and into the second coolant passage 176 in direction 184. As the coolant flows through the second coolant passage 176, the coolant exits the block 46 through the second coolant outlet 132 and enters the second cooler 32. In the cooler 32, the coolant exchanges thermal energy (e.g., transfers heat) with a lubricant and then renters the block 46 through the second coolant inlet 134. The coolant then flows again through the second coolant passage 176 before exiting the block 46 through coolant outlet 72.

The lubrication passage 172 includes a first lubricant passage 186, a second lubricant passage 188, and a third lubricant passage 190. As illustrated, the first lubricant passage 186 fluidly couples to the first lubricant inlet 128, the first lubricant exit 130, and the second lubricant passage 188, which enables lubricant to circulate through the first cooler 30. The second lubricant passage 188 fluidly couples to the second lubricant inlet 136, the second lubricant outlet 138, and the first lubricant passage 186, which likewise enables lubricant to circulate through the second cooler 32.

In order to receive lubricant, the first lubricant passage 186 fluidly couples to a lubricant valve aperture 192 and the second lubricant passage 188 fluidly couples to a lubricant valve chamber 194. Lubricant flows into the lubricant valve chamber 194 through the third lubricant passage 192 from the lubricant inlet 74. In some embodiments, the lubricant valve chamber 194 may also receive lubricant from the second lubricant inlet 78. As will be explained in detail below in FIG. 5, the lubricant valve 52 controls the lubricant flow through the block 46 from the lubricant inlets 74 and 78. In operation, as lubricant flows into the block 46, the valve 52 directs lubricant flow into the first lubricant passage 186 or into the second lubricant passage 188. More specifically, the valve 52 may direct the lubricant entering the lubricant valve chamber 194 to flow through the lubricant valve aperture 194 and into the first lubricant passage 186 or out of the lubricant valve chamber 194 and into the second lubricant passage 188. For example, the valve 52 may block lubricant flow into the second lubricant passage 188 and, therefore, direct lubricant flow in direction 182 through the lubricant valve aperture 192 and into the first lubricant passage 186. As the lubricant flows through the first lubricant passage 186, the lubricant exits the block 46 through the first lubricant exit 128 and enters the first cooler 30. In the cooler 30, the lubricant exchanges thermal energy (e.g., transfers heat) with a coolant and then renters the block 46 through the first lubricant inlet 130. The lubricant then flows again through the first lubricant passage 186 before entering the second lubricant passage 188. Alternatively, the valve 52 may plug the lubricant valve aperture 192 and direct lubricant flow out of the lubricant valve chamber 194 and into the second lubricant passage 188 in direction 184. As the lubricant flows through the second lubricant passage 188, the lubricant exits the block 46 through the second lubricant outlet 136 and enters the second cooler 32. In the cooler 32, the lubricant exchanges thermal energy (e.g., transfers heat) with a coolant and then renters the block 46 through the second lubricant inlet 138. The lubricant then flows again through the second lubricant passage 188.

After passing through either the first cooler 30 or the second cooler 32, the lubricant is directed to the first and second lubricant filters 34, 36 through the second lubricant passage 188. As illustrated, the second lubricant passage 188 fluidly couples to the filter valve chamber 196. The filter valve chamber 196 in turn fluidly couples to the filter valve passage 198 enabling the filter valve 50 to direct the lubricant to the first filter 34 or the second filter 36. For example, the valve 50 may block lubricant flow in direction 200, thus directing the lubricant flow in direction 202 through the filter valve passage 198 and into the filter 36. Alternatively, the valve 50 may block lubricant flow through the filter valve passage 198 in direction 202, thus directing the lubricant flow in direction 200 and into the filter 34. In order to block reverse flow through the first and second filters 34, 36, the first and second filter receptacles 80 and 82 include first and second counterbores 204, 206 that receive respective first and second check valves 208 and 210 (e.g., pressure-activated one-way valves). The first and second check valves 208 and 210 enable lubricant to exit the filters 34 and 36 in direction 184, but block the reverse flow of lubricant in direction 182. After passing through the first and second filters 34, 36, and the first and second check valves 204 and 206, the lubricant enters a fourth lubricant passage 212. The fourth lubricant passage 212 directs the lubricant to the lubricant outlet 76 for reuse in the compressor 14. As illustrated, all of the passages, valves.

FIG. 5 is a cross-sectional view of the valve 50. While the discussion related to FIG. 5 covers valve 50, it should be understood that the valve 50 may be similar or identical to the valves 48 and 52 in both operation and components. As illustrated, the valve 50 rests within the filter valve passage 198. In operation, the valve 50 alternatingly moves a diverter plug 230 in directions 232 and 234 within the filter valve chamber 196, to control the direction of fluid flow through filter valve passage 198. In FIG. 5, the diverter plug 230 is in a first position 236 that directs lubricant into a first portion 238 of the filter valve passage 198. As illustrated, the first portion 238 of the filter valve passage 198 fluidly couples to the first filter receptacle 80 enabling the valve 50 to direct lubricant into the filter 36. Similarly, the diverter plug 230 may be moved into a second position 240, illustrated with dashed lines 242. In the second position 240, the diverter plug 230 blocks fluid flow into the first portion 238 of the filter valve passage 198 and redirects fluid flow into the second portion 244 of the filter valve passage 198. As illustrated, the second portion 244 of the filter valve passage 198 fluidly couples to the second filter receptacle 82 enabling the valve 50 to direct lubricant into the filter 34. In either the first or second position 236 and 240, the diverter plug 230 forms a fluid tight seal with the respective first portion 238 or second portion 244 of the filter valve passage 198. The diverter plug 230 includes a first sealing portion 246, a second sealing portion 248, and a flange 250 in between the first and second sealing portions 246, 248 to enable sealing. In the first position 236, the first sealing portion 246 and flange 250 form a fluid tight seal with the second portion 244 of the filter valve passage 198. In the second position 240, the second sealing portion 248 and the flange 250 form a fluid tight seal with the first portion 238 of the filter valve passage 198.

The diverter plug 230 couples to a shaft 252 with a pin 254, enabling the shaft 252 to move the diverter plug 230 in directions 232 and 234. The shaft 252 threadingly couples to a nut 256 coupled to an extension rod 258. In operation, the rotation of the extension rod 258 induces the shaft 252 to thread into and out the nut 256 and an aperture 260 in the extension rod 258. For example, as the shaft 252 threads into the nut 256 in direction 234, the diverter plug 230 transitions, moves axially in direction 234, from the first position 236 to the second position 240. Likewise, when the shaft 252 threads out of the nut 256, the shaft 252 moves in direction 236 transitioning the diverter plug 230 from the second position 240 to the first position 236. As illustrated, the valve 50 includes a bearing housing 262 that retains the extension rod 258 within the filter valve aperture 198. In some embodiments, the bearing housing 262 may rest within and form a seal with a counterbore 264 in the block 46. The bearing housing 262 couples to the block 46 with fasteners (e.g., bolts 266) that pass through a top plate 268 coupled to the bearing housing 262. The top plate 268 retains the bearings 270 within the bearing housing 262 to facilitate rotation of the extension rod 258.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A system, comprising:
   a lubrication system, comprising;
   a block, comprising:
   a first cooler interface structured to couple with a first cooler having a first mating cooler interface;
   a second cooler interface structured to couple with a second cooler having a second mating cooler interface; and
   at least one lubrication passage extending through the block, wherein the at least one lubrication passage fluidly coupled to the first cooler interface and to the second cooler interface;
   wherein the at least one lubrication passage includes:
   a first lubrication inlet formed in the block;
   a first lubrication passageway connected to the first lubrication inlet;
   a second lubrication inlet formed in the block;
   a second lubrication passageway connected to the second lubrication inlet; and
   a third lubrication passageway formed within the block fluidly coupled to each of the first and second lubrication passageways;
   and
   at least one valve within the block, configured to control a flow of a lubricant through the at least one lubrication passage relative to the first cooler and/or the second cooler, and including an electronically controlled actuator structured to move the at least one valve from a first configuration where a lubricant flow path through the lubrication system to and from both of the first cooler interface and the second cooler interface, to a second configuration where the fluid flow path extends to and from only one of the first cooler interface and the second cooler interface.

2. The system of claim 1, comprising a coolant passage extending through the block, wherein the coolant passage is fluidly coupled to the first cooler interface and the second cooler interface.

3. The system of claim 2, comprising first and second coolant check valves in the coolant passage, wherein the first coolant check valve is configured to block reverse flow of the coolant through the first cooler and the second coolant check valve is configured to block reverse flow of the coolant through the second cooler.

4. The system of claim 1, wherein the at least one valve includes a second valve within the block, wherein the second valve is configured to control a coolant flow through the coolant passage relative to the first cooler and/or the second cooler.

5. The system of claim 4, comprising a third valve within the block, wherein the third valve is configured to control a lubricant flow relative to a first lubricant filter and/or a second lubricant filter.

6. The system of claim 1, comprising the first cooler and the second cooler, and first and second coolant valves, wherein the first coolant valve is fluidly coupled to the first cooler and the second coolant valve is fluidly coupled to the second cooler, and where the first and second coolant valves are configured to drain coolant out of the respective first and second coolers.

7. The system of claim 1, comprising first and second lubricant valves, wherein the first lubricant valve is fluidly coupled to the first cooler interface and the second lubricant valve is fluidly coupled to the second cooler interface, and where the first and second lubricant valves are configured to drain lubricant out of the respective first and second coolers.

8. The system of claim 1, comprising first and second lubrication check valves in the lubrication passage, wherein the first lubrication check valve is configured to block reverse flow of the lubricant through the first cooler and the second lubrication check valve is configured to block reverse flow of the lubricant through the second cooler.

9. The system of claim 1, wherein the block comprises first and second lubrication filter cavities in fluid communication with the lubrication passage, wherein the first lubrication filter cavity is configured to receive a first lubrication filter, and the second lubrication filter cavity is configured to receive a second lubrication filter.

10. The system of claim 9, comprising first and second lubrication filter check valves, wherein the first lubrication filter check valve is configured to block reverse flow of lubricant through the first lubrication filter, and the second lubrication filter check valve is configured to block reverse flow of lubricant through the second lubrication filter.

11. A system, comprising:
a lubrication system, comprising:
a block, comprising:
a first coolant inlet;
a first coolant outlet;
a first cooler interface;
a first coolant passage fluidly coupled to the first cooler interface;
a second coolant passage fluidly coupled to the second cooler interface;
a first lubricant inlet;
a first lubricant outlet;
a first lubricant passage fluidly coupled to the first cooler interface; and
a second lubricant passage fluidly coupled to the second cooler interface;
a first cooler comprising a first mating cooler interface coupled to the first cooler interface; and
a second cooler comprising a mating second cooler interface coupled to the second cooler interface;
a first valve passage within the block, wherein the first and second lubricant passages fluidly couple to the first valve passage, wherein the first valve passage is configured to support a first valve;
a third lubricant passage fluidly coupled to the first and second lubricant passages and to the lubricant outlet; and
a fourth lubricant passage fluidly coupled to a second lubricant inlet and the first valve passage.

12. The system of claim 11, comprising a second valve passage within the block, wherein the second valve passage is fluidly coupled to the first and second lubricant passages, wherein the second valve passage is configured to support a second valve.

13. The system of claim 11, comprising a third valve passage within the block, wherein the third valve passage is fluidly coupled to the first and second coolant passages.

14. The system of claim 11, comprising a first lubricant filter aperture and a second lubricant filter aperture within the block.

15. A system, comprising:
a lubrication system, comprising:
a block, comprising:
a first cooler interface;
a second cooler interface;
a first filter aperture configured to receive a first lubrication filter within the block;
a second filter aperture configured to receive a second lubrication filter within the block; and
at least one lubrication passage extending through the block, wherein the at least one lubrication passage fluidly couples to the first cooler interface, the second cooler interface, the first filter aperture, and the second filter aperture;
a first cooler comprising a first mating cooler interface coupled to the first cooler interface; and
a second cooler comprising a second mating cooler interface coupled to the second cooler interface; and
at least one valve within the block, and being movable, to control a flow of lubricant or coolant through the lubrication system, from a first configuration where a fluid flow path through the lubrication system extends through both of the first cooler and the second cooler, to a second configuration where the fluid flow path extends through only one of the first cooler and the second cooler; and
a coolant passage extending, through the block, wherein the coolant passage is, fluidly coupled to the first cooler interface and the second cooler interface and wherein the coolant passage further comprises:
a first coolant inlet formed in the block;
a first coolant passageway connected to the first coolant inlet;
a second coolant inlet formed in the block:
a second coolant passageway connected to the second coolant inlet; and
a third coolant passageway formed within the block fluidly coupled to each of the first and second coolant passageways.

16. The system of claim 15, wherein the at least one valve is configured to selectively enable a coolant flow through the first cooler, the second cooler, or a combination thereof.

17. The system of claim 15, wherein the at least one valve is configured to selectively enable a lubricant flow through the first cooler, the second cooler, or a combination thereof.

* * * * *